(12) United States Patent
Benayoun et al.

(10) Patent No.: US 6,256,323 B1
(45) Date of Patent: Jul. 3, 2001

(54) METHOD AND APPARATUS FOR EFFICIENTLY TRANSPORTING ASYNCHRONOUS CHARACTERS OVER AN ATM NETWORK

(75) Inventors: Alain Benayoun, Chagnes sur Mer; Patrick Michel, La Gaude; Maurice Duault, Saint Laurent du Var; Jean-Francois Le Pennec, Nice, all of (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/052,286

(22) Filed: Mar. 31, 1998

(30) Foreign Application Priority Data

Dec. 8, 1997 (EP) .................................................. 97480014

(51) Int. Cl.[7] ..................................................... H04J 3/26
(52) U.S. Cl. .......................................... 370/474; 370/476
(58) Field of Search ................................... 370/474, 476, 370/465, 466, 395

(56) References Cited

U.S. PATENT DOCUMENTS

| | | | |
|---|---|---|---|
| 4,630,232 | * 12/1986 | Loskorn et al. | 710/51 |
| 5,056,088 | * 10/1991 | Price et al. | 370/466 |
| 5,384,770 | * 1/1995 | Mays et al. | |
| 5,550,819 | 8/1996 | Duault | 370/60.1 |
| 5,600,682 | * 2/1997 | Lee | 375/354 |
| 5,638,365 | 6/1997 | Duault et al. | 370/395 |
| 5,930,265 | 7/1999 | Duault et al. | 370/473 |
| 5,987,034 | 11/1999 | Simon et al. | 370/465 |
| 6,038,694 | 3/2000 | Swallow | 714/781 |
| 6,058,114 | 5/2000 | Sethuram et al. | 370/397 |
| 6,072,773 | 6/2000 | Fichou et al. | 370/230 |

* cited by examiner

Primary Examiner—Min Jung
(74) Attorney, Agent, or Firm—Cesari and McKenna, LLP; A. Sidney Johnston

(57) ABSTRACT

Method of processing asynchronous characters in order to transmit them over an ATM network (10, 12 or 16) of a communication system having a first endpoint (36) and a second endpoint (38), a first group of one or more Data Terminal Equipments (DTE) being connected to the first endpoint and a second group of one or more DTE's being connected to the second endpoint and wherein data are transmitted from the first group of DTE's to the second group of DTE's by the intermediary of the ATM network. Asynchronous characters are processed as they are received at the first endpoint from the first group of DTE's by removing Start, Stop and parity bits. A block is generated consisting of one or more processed asynchronous characters received in sequence from a particular DTE of the first group of DTE's. An ID byte is added to the block to identify the transmitting DTE, yielding a data unit. A plurality of such data units are concatenated to build a data unit frame. The data unit frame is encapsulated into an ATM cell structure in order to transmit the frame over the ATM network.

11 Claims, 9 Drawing Sheets

METHOD AND APPARATUS FOR EFFICIENTLY TRANSPORTING ASYNCHRONOUS CHARACTERS OVER AN ATM NETWORK

FIELD OF THE INVENTION

The present invention deals with asynchronous transfer mode (ATM) networks and relates more particularly to a method of efficiently transporting asynchronous characters over an ATM network by using the ATM adaptation layer facility.

BACKGROUND OF THE INVENTION

Broadband Integrated Services Digital Network or B-ISDN is a new telecommunication technology developed by the telecommunications carrier industry for both data transmissions (computer) and telecommunications (telephone). It is conceived as a carrier service to provide high speed communications to end users. The technology selected to deliver B-ISDN service is called "Asynchronous Transfer Mode" or ATM. The acceptance of ATM comes from the fact that ATM handles all the different kinds of communication traffic, such as voice, data, image, video, high quality sound, multimedia and others. ATM traffic can be carried in both LAN (Local Area Network) and WAN (Wide Area Network) network environments and hence promises a seamless inter-working between the two.

ATM handles all types of traffic adequately and in an integrated way. This means that, instead of having a proliferation of many specialized kinds of equipment for different functions, it is now possible to have a single type of equipment and network which will do everything.

Communication technologies have realized considerable progress and many potential applications that were not possible before are now becoming accessible and attractive. One of the driving forces behind ATM development is the need for a communication network architecture that can take advantage of the the following changes: high speed rates can now be sustained with very low bit error rates with the maturing of new transmission media and especially of optical fibers: the very real user demand for data communication services and for ever faster services; silicon chip technology has improved to the point where very fast switching systems can be built; the general belief that integrated packet (or cell) based switching systems are significantly lower in cost than Time Division Multiplexed (TDM) type systems; and the development (again due to improvement in silicon technology) of much faster and lower-cost computer hardware makes many new applications possible that were not economically feasible before. The principle key concepts of ATM are as follows:

Cells: all information (voice, image, video, data . . . ) is transported through the network in very short, fixed length (48 data bytes plus a 5-byte header) blocks called cells. The ATM cell size was determined by the CCITT, now called the International Telecommunication Union (ITU), as a compromise between voice and data requirements.

Routing: information flow along paths (called "virtual channels") is set up as a series of pointers through the network. Each cell header contains an identifier that links the cell to the correct path towards its destination. Cells on a particular virtual channel always follow the same path through the network and are delivered to the destination in the same order in which they are received.

Hardware-Based Switching: ATM is designed so that simple hardware based logic elements may be employed at each node to perform the switching. On a link of 1 Gbps, a new cell arrives and a cell is transmitted every 0.43 microseconds. There is not a lot of time decide what to do with an arriving cell.

Adaptation: at the edges of the network, data frames are broken up into cells. Continuous data streams such as voice and video are segmented into cells. At the destination side of the network the user data frames are reconstructed from the received cells and returned to the end user in the form (data frames etc.) that they were delivered to the network. This adaptation function is considered part of the network but is in a higher layer function, which is called ATM Adaptation Layer (AAL).

Error Control: the ATM cell switching network checks cell headers for errors and simply discards cells in error. The adaptation function AAL is external to the switching network and depends somewhat on the type of traffic but for data traffic it usually checks for errors in data frames received and if one is found it discards the whole frame. At no time does the ATM network attempts to recover from errors by the re-transmission of information. This function is up to the end user devices and depends on the type of traffic being carried and the adaptation layer being used.

Flow Control: an ATM network typically does not implement internal flow control. The required processing logic is generally considered too complex to be accommodated at the speeds involved. Instead ATM has a set of input rate controls that limit the rates at which traffic is delivered to the network.

Congestion Control: When a link or node becomes congested, cells are discarded by the network until the problem has been relieved. Some (lower priority) cells can be marked such that they are the first to be discarded in the case of congestion. Connection endpoints are not notified when cells are discarded. It is up to the adaptation function or higher-layer protocols to detect and recover from the loss of cells (if necessary and possible).

In order to make an ATM network practical it is necessary to adapt the internal network characteristics to those of the various traffic types that will use the network. This is the of the adaptation layer. It would have been possible to leave this function to end-user equipment suppliers but that could mean that many different systems of voice or video coding (many incompatible with one another) would come into use. The function of the adaptation layer is to provide generalized inter-working across the ATM network. In the case of data, the AAL takes frames (blocks) of data delivered to it, breaks them up into cells and adds necessary header information to allow rebuilding of the original block at the receiver.

Recommendations of the International Telecommunication Union (ITU) have defined four generic classes of network traffic that need to be processed differently by an ATM network. These classes are class A for constant rate voice and video applications, class B for isochronous voice and video traffic with variable bit rate services, class C for traditional data traffic as known in an SNA or X.25 network, and class D intended to support connectionless networking protocols such as TCP/IP.

The AAL function implements a number of end-to-end protocols across the ATM network to provide support for end users of the four identified service classes. There are five different AAL types called AAL-1 to AAL-5. AAL-5, which offers very high performance and is available in every workstation provides services for the support of data, video, signaling traffic and can also be used for voice.

Unfortunately, no traffic class has been provided for the transmission of asynchronous data wherein each character contains several bits of data (generally 5 to 9 bits), one START bit and one or two STOP bits. Such asynchronous data is transmitted on a serial bus (such as the RS 232 link) which exists on all personal computers.

Several techniques are nevertheless used to transport Start-Stop protocols over an ATM network. One of them consists in sampling the sequence of asynchronous characters to get a stream of synchronous data bits. But, the sampling frequency must be at least 4 times the speed defined on the interface in order to get correct data on the other side of the network. The main drawback of such a technique is therefore the necessary overhead and the fact that the required bandwidth is used even if no data is present.

Another technique is the use of a Packet Assembly/Disassembly (PAD) facility wherein the asynchronous data is encapsulated with X.28 protocol before being converted to X.25 protocol by the PAD (X.3 protocol). Such a technique requires significant overhead and introduces a delay in the transmission. Furthermore, X.25 protocol is applied for each user address and no data streaming mode is available.

There is another technique using the so-called Frame Relay Access Device (FRAD) enabling the asynchronous data to be transported over an ATM network. But, it is similar to the PAD technique and has the same drawbacks.

SUMMARY OF THE INVENTION

Therefore, the object of the invention is to provide a method for transporting asynchronous data over an ATM network without adding significant overhead or introducing a delay.

Another object of the invention is to provide a method for efficiently transporting asynchronous data over an ATM network by using the existing ATM adaptation layer of the access point.

The invention is intended for use in a communication system including an intermediate network through which data is transmitted in fixed length cells and a set of one or more sources of asynchronous data traffic. Asynchronous characters provided by said sources are processed to provide data in a form suitable for transport through the intermediate network. Any Start, Stop and parity bits are stripped from each asynchronous character received from any of the sources in said set to produce a character data unit. A data block is assembled having one or more character data units resulting from processing asynchronous characters received in sequence from the same source in said set. At least one source-identifying ID byte is added to each assembled data block to create a data unit. A data unit frame is generated by concatenating a plurality of data units. Each data unit frame is encapsulated within a fixed length cell structure for transport through the intermediate network.

BRIEF DESCRIPTION OF THE DRAWINGS

The objects, characteristics and advantages of the invention will become apparent from the following description when read with reference to the accompanying drawings which specify a preferred embodiment of the invention.

DETAILED DESCRIPTION OF THE INVENTION

Figure 1:
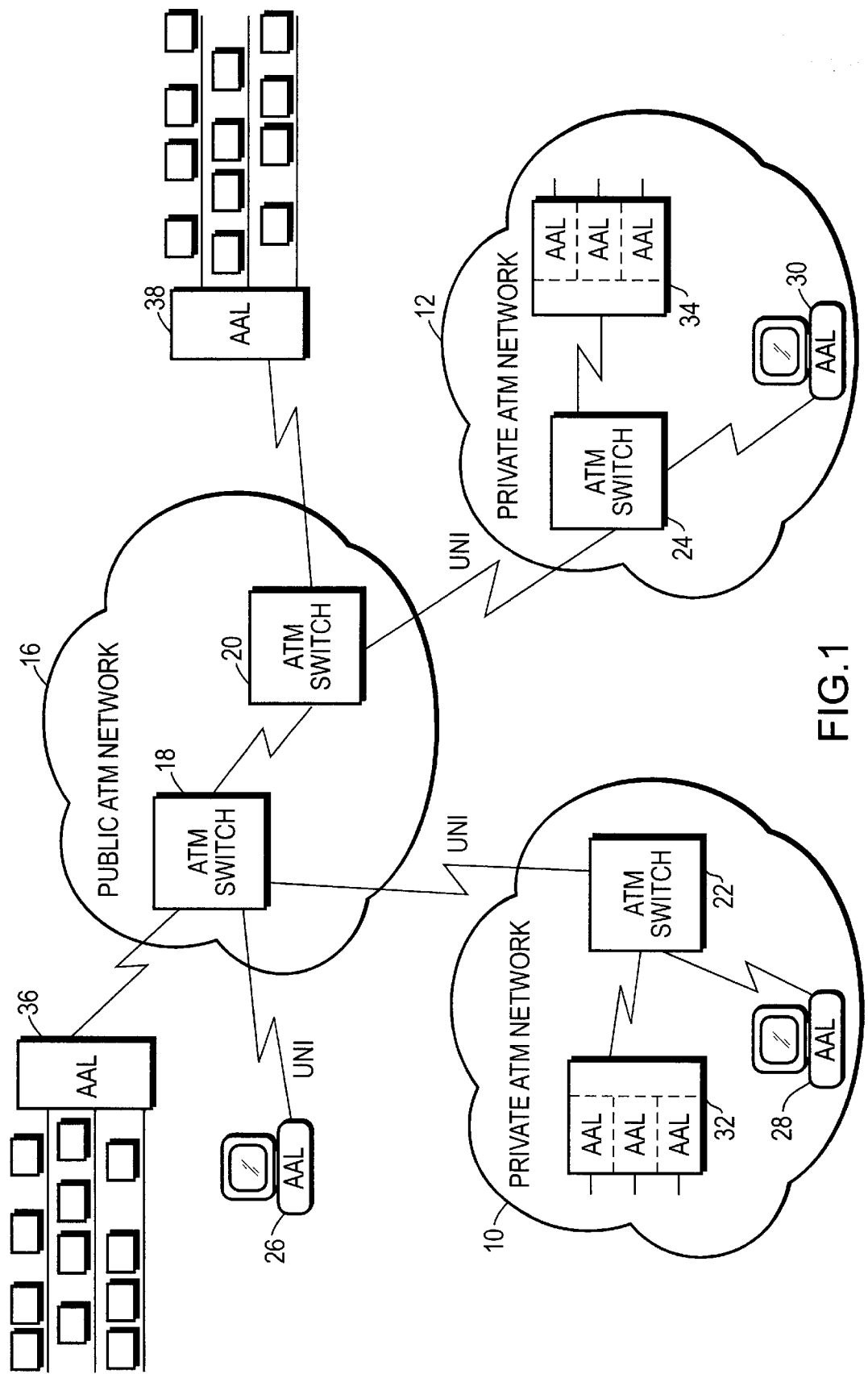
FIG. 1 is a schematic representation of a communication system including ATM networks wherein the invention can be implemented.

FIG. 1 shows three separate ATM networks—two private networks 10 and 12 and one public network 16. Private ATM networks are very often confined to a local area such as a building or a campus. However, a private ATM network can be distributed over a wide area by the use of carrier (non-ATM) links between nodes.

Four ATM Switches 18, 20, 22 and 24 are shown in FIG. 1. These perform the backbone data transport for the ATM network. They are usually classified as either Private ATM Switches like switches 22 and 24 or Public ATM Switches like switches 18 and 20.

An ATM endpoint is a piece of end user equipment that has a native (ATM) interface to an ATM network. An endpoint sends and receives ATM cells on link connections defined by ATM standards. An endpoint (and only an endpoint) contains an ATM Adaptation Layer (AAL) function. An ATM endpoint connects to the ATM network over a User Network Interface (UNI).

There are endpoints which connect only one user equipment, such as endpoints 26, 28, 30, and endpoints which connect several user equipments, such as endpoints 32, 34. Endpoints 36 and 38 are each connected to three terminals transmitting asynchronous characters which are schematically represented in FIG. 1 by small rectangles. For sake of example, each asynchronous terminal connected to endpoint 36 exchanges asynchronous characters with one of the asynchronous terminals connected to endpoint 38 according to the method of the invention as explained later.

For a better understanding of the invention, it is useful to explain the structure and the operation of the ATM layer (AAL) before going further.

Figure 2:
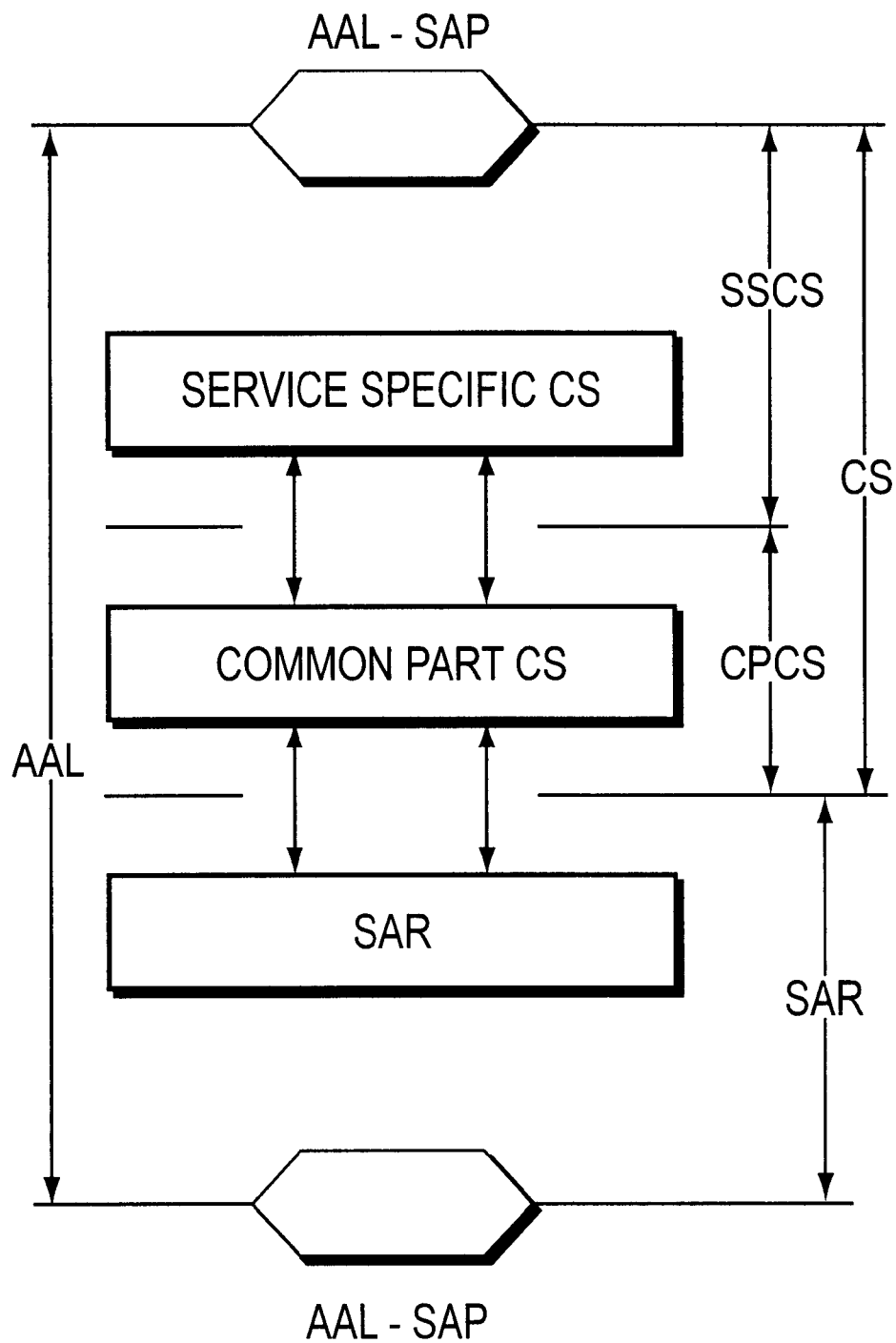
FIG. 2 is a representation of ATM layer structure as defined in the International Telecommunication Union (ITU) standards.

The AAL structure illustrated in FIG. 2 consists of:

1) An original Convergence Sublayer (CS) divided into a Service Specific Convergence Sublayer (SSCS) for providing additional functions as required for specific services, and a Common Part Convergence Sublayer (CPCS) for building header and trailer records onto user data frame. This Sublayer assures integrity at the frame level; and 2) A Segmentation and Reassembly Sublayer (SAR) for taking data and building a stream of 48-byte cells. This sublayer adds cell headers and trailers to provide integrity at the cell level.

The various sublayers cooperate to provide the AAL services from top to bottom on the source side and from bottom to top on the destination side. Sending implies segmentation while receiving implies reassembling data.

Figure 3:
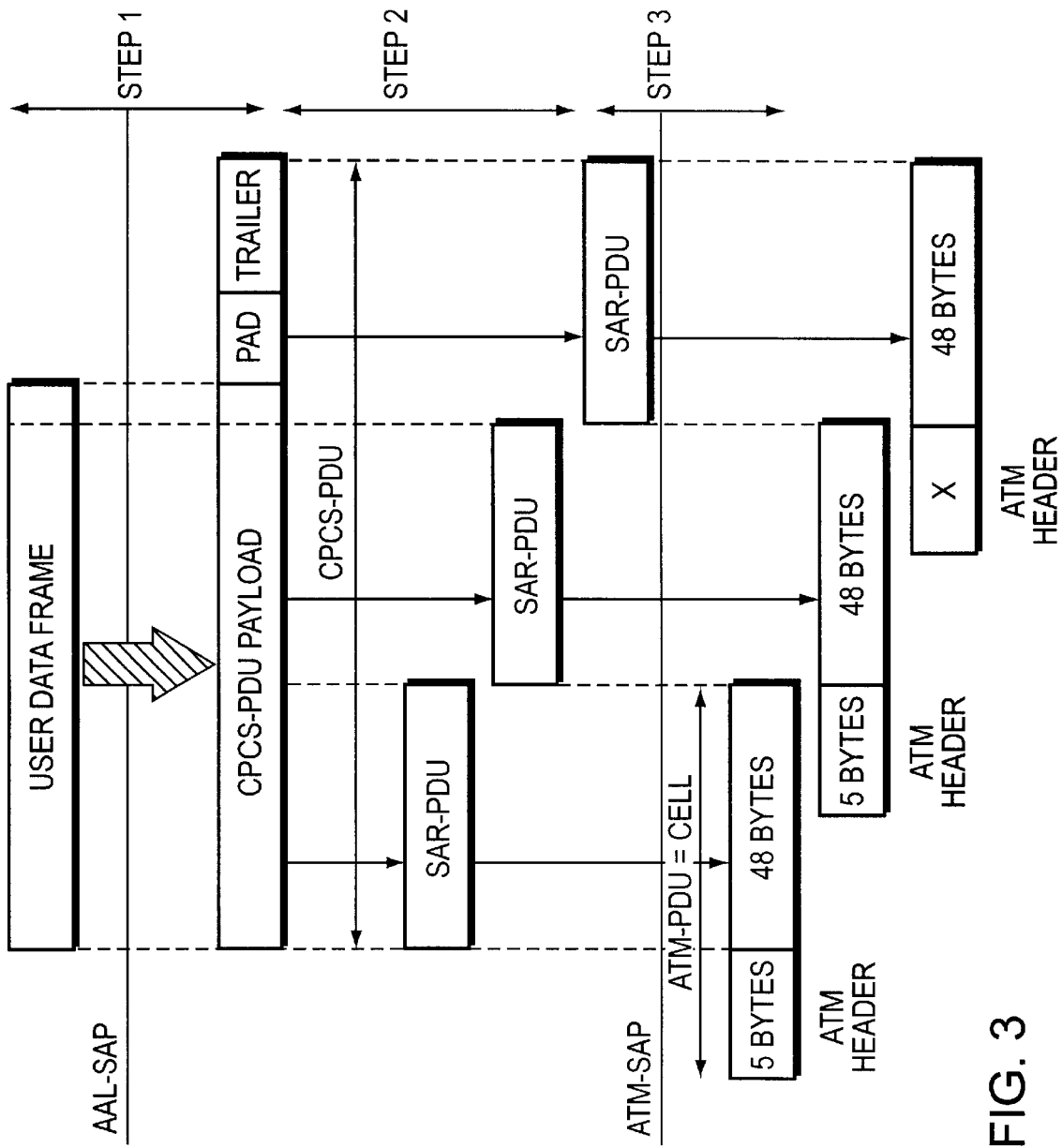
FIG. 3 is a representation of the ATM layer operation according to the classical ATM procedure.

The operation of the ATM layer as illustrated in FIG. 3 is composed of 3 steps.

In Step 1, a data frame is received at the AAL-SAP. The frame may or may not be processed by an SSCS. The data is passed as a CPCS payload Protocol Data Unit (or CPCS-PDU) to the CPCS which appends its control information as single trailer record and inserts pads so that the length of the new CPCS-PDU is a multiple of 48 bytes. The information present in the CPCS trailer is sufficient to provide assurance that the PDU has been reassembled correctly by the SAR after it has been carried through the network. The CPCS-PDU is then passed to the SAR.

In Step 2, the SAR segments the CPCS-PDU into 48-byte SAR-PDUs. Note there is no header or trailer information added. The SAR passes these 48-byte segments to the ATM layer and indicates the last segment in the group as a parameter in the call to the ATM layer.

In Step 3, the ATM layer builds a 5-byte ATM header and includes the EOM flag (x) in the ATM header of the last SAR-PDU.

The reverse process happens on reception.

The purpose of the invention is to use the SAR and CPCS functions of the ATM layer as described above and to define an AAL Service Specific Convergence Sublayer for performing the processing of the asynchronous characters.

Figure 4:
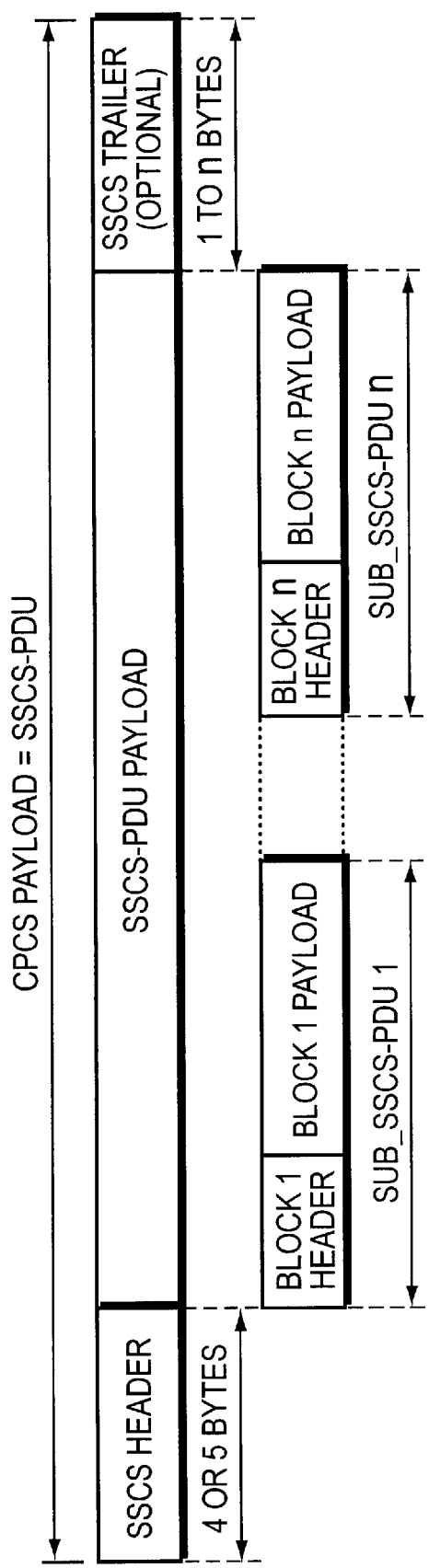
FIG. 4 is a representation of the SSCS-PDU format used for the implementation of the invention.

The format of the Protocol Data Unit of a Service Specific Convergence Sublayer (SSCS-PDU) according to the invention is illustrated in FIG. 4. In addition to the SSCS-PDU payload, which contains the processed asynchronous data the SSCS-PDU or CPCS payload includes a header and a trailer.

The SSCS header has up to 5 bytes, each one being a special field. The first byte contains the NS Sending Sequence Number used to put the cells in a chronological order. The value range is 0–255. On the receive side, this field is used to build the Receive Sequence Number and Receive Status fields. The second byte indicates, by its first bit, if the fifth byte of the SSCS header is present or not. The other bits are used to transmit status such as idle change window size and window size value, retransmission of lost cells, reset sequence number. The third byte contains the NR Receive Sequence Number which is the last Received Sequence Number corresponding to the NS field of the remote device. The fourth byte indicates the status of the reception with respect to the NR field indicating for example that the cells between the previous acknowledgment and the indicated NR value were correctly received. Other status that may be indicated include a not received or bad CRC status. The fifth byte is used to indicate the number of blocks within the SSCS-PDU payload. This field is optional. The use of this field indicates that at least one byte of SSCS trailer is present.

If complex information is to be transmitted, the SSCS trailer may be used. Its first byte indicates the type of information transmitted and the number of additional bytes of this trailer.

Figure 5:
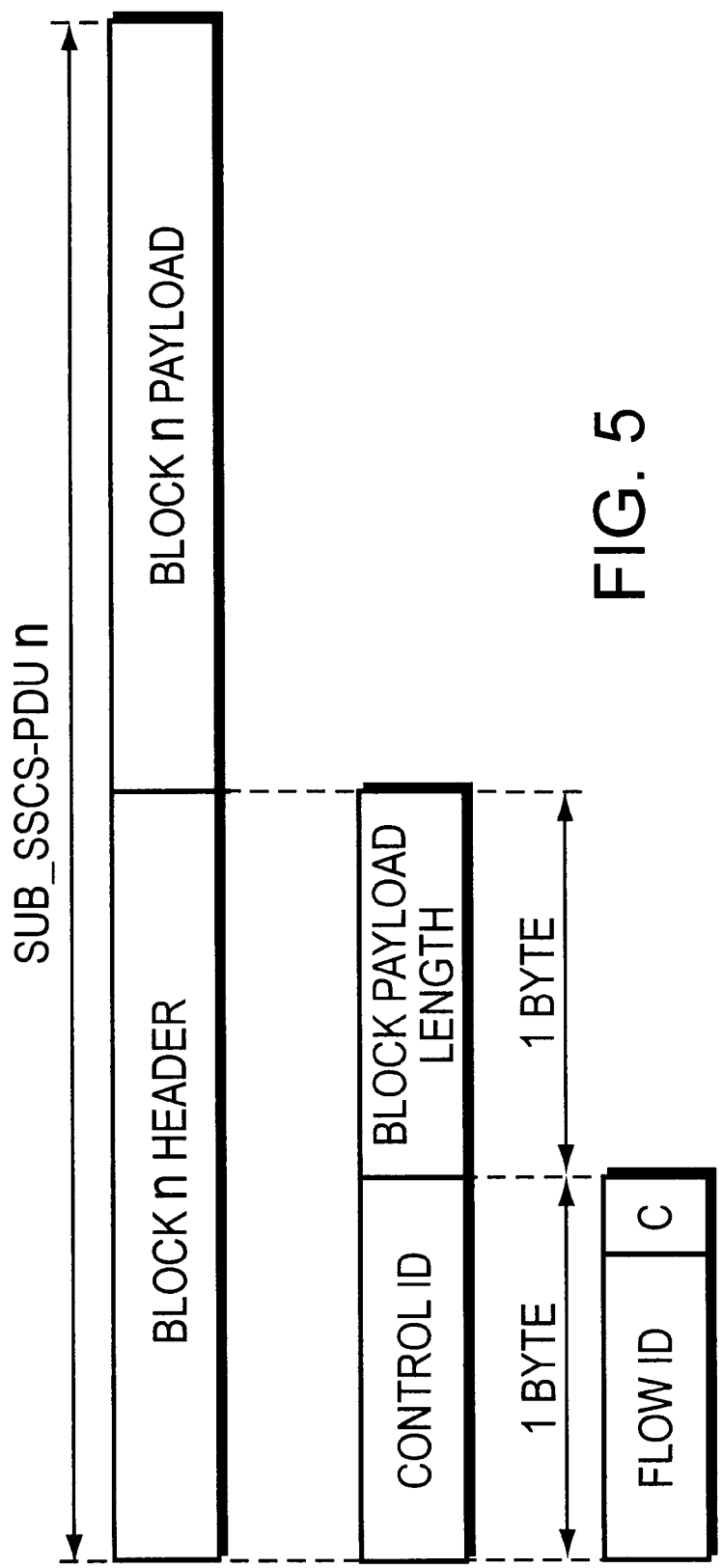
FIG. 5 illustrates the format of the Sub-SSCS-PDU used in the method of the invention.

The SSCS-PDU payload is composed of one or several sub_SSCS-PDU's which are blocks of asynchronous data as explained below. Each one handles one communication flow between asynchronous end devices. Each sub_SSCS-PDU the format of which is illustrated in FIG. 5 is composed of two main fields: the header and the payload.

The Sub_SSCS-PDU header contains two fields. The Control Id Field is a single byte whose LSB bit indicates if the payload contains data or control information. The seven remaining bits are used to define the Flow Id in order to identify the flow since the position of a given flow within the SSCS-PDU may differ from one cell to another. The second and last field, also one byte, is the Sub_SSCS-PDU payload length, also called Block Payload Length. This field indicates the number of codewords (not necessarily bytes) contained in the payload. This allows to location of the position of the next Sub_SSCS-PDU payload block.

The Sub_SSCS-PDU payload in position n, also called Block n Payload, contains data or control. For a new connection, a setup allows some parameters to be set using the above control mode, at least the length of the codeword.

The sub_SSCS-PDU can be used also as a control block. In such a case, the block payload contains at least one byte which is the ASYNC type defining either the ASYNC mode or the COMPRESSION mode. All this information is used to build the same type of asynchronous interface or at least a compatible one at the remote side of the connection.

Figure 6:
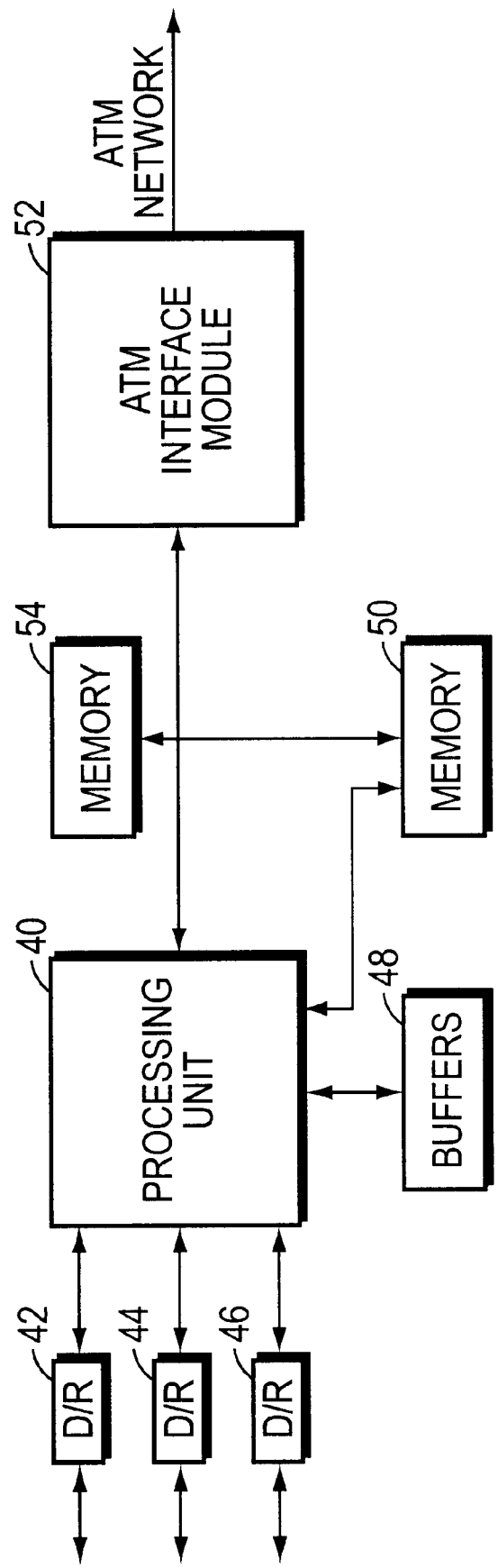
FIG. 6 represents a block-diagram of the functional units of the ATM layer.
Figure 7:
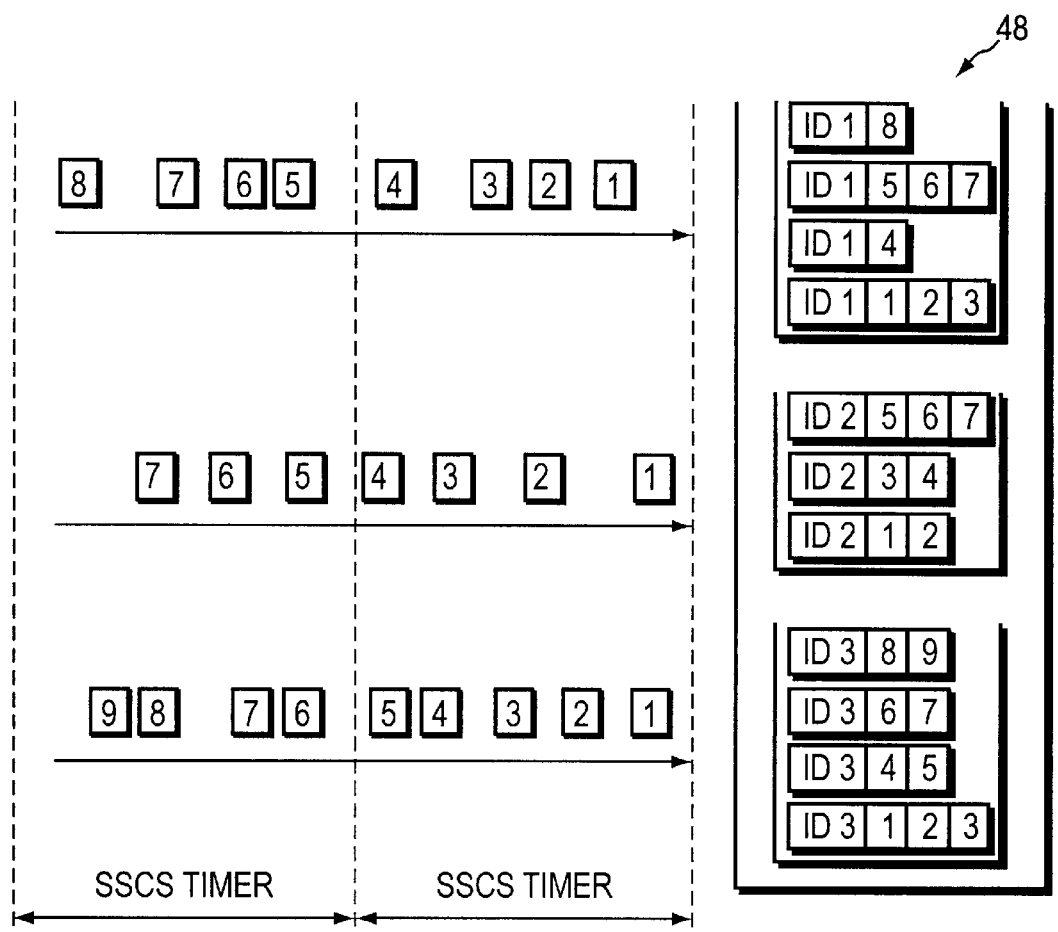
FIG. 7 is a schematic representation of the asynchronous characters as they are accumulated in the buffers of the ATM layer.

The mechanism associated with endpoint 36 (or endpoint 38) of FIG. 1 which enables implementation of the method of the invention is now described with reference to FIG. 6. See also FIG. 7 which represents schematically the concatenation of the received asynchronous characters which are stored in buffers 48, and FIG. 8 which shows two frames which are built from the blocks stored in buffers 48 and then stored in memory 50.

Each interface with an asynchronous terminal is connected to a processing unit 40 by means of a driver/receiver (D/R) such as 42, 44 or 46. Each asynchronous flow has a defined identification number ID. When asynchronous characters are received, they are processed by removing the Start, Stop and parity bits. The byte Control ID is added to a block of characters which are accumulated in buffers 48 (see FIG. 7).

Figure 8:
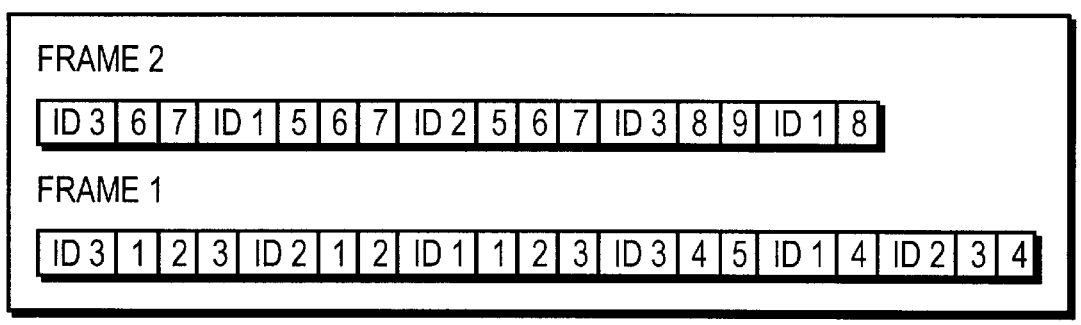
FIG. 8 is a schematic representation of SSCS frame which is built by the concatenation of the blocks containing the asynchronous characters.

Then, the data blocks are multiplexed under control of processing unit 40 to form SSCS frames which are stored into memory 50 (see FIG. 8). SSCS frames continue to be built as long as blocks are received provided SSCS timer, started with the first block, is running and the maximum frame length is not reached. The order of the blocks within the frame is only dependent upon the availability of the blocks on each interface.

It must be noted that the value of the SSCS timer may be reduced when necessary, but this is not a mandatory function. Thus, it may be useful to reduce this value if the time value is too long compared to the interface control timers.

The SSCS frames are processed by processing unit 40 which adds the SSCS header and/or trailer to the frames stored in memory 50 before sending them to the ATM interface module 52 for the ATM encapsulation by performing the CPCS and SAR functions described above. When a frame is ready, a pointer is set to allow the ATM interface module to transmit the frame over the ATM network. Note that a streaming mode is allowed since the transmission of a part of a frame is feasible as soon as at least 48 bytes of SSCS frame are available even if the full frame is not ready. This reduces the processing and storage delay and transmission can start without additional overhead.

The reverse process is performed for the reception of data. The ATM cells which are received by ATM interface module 52 are stored in memory 54 before being de-capsulated and demultiplexed by processing unit 40. Blocks of asynchronous data with the ID byte are then stored into buffers 48 before being transmitted on the asynchronous interfaces by one driver/receiver 42, 44 or 46.

It must be noted that many configurations are possible to implement the invention. Thus, it is possible to transmit the frames to be encapsulated from memory 50 to memory 54 by using the Direct Memory Access (DMA) procedure. Also, the processing may be split between several processing units or the number of memories can be reduced.

Figure 9:
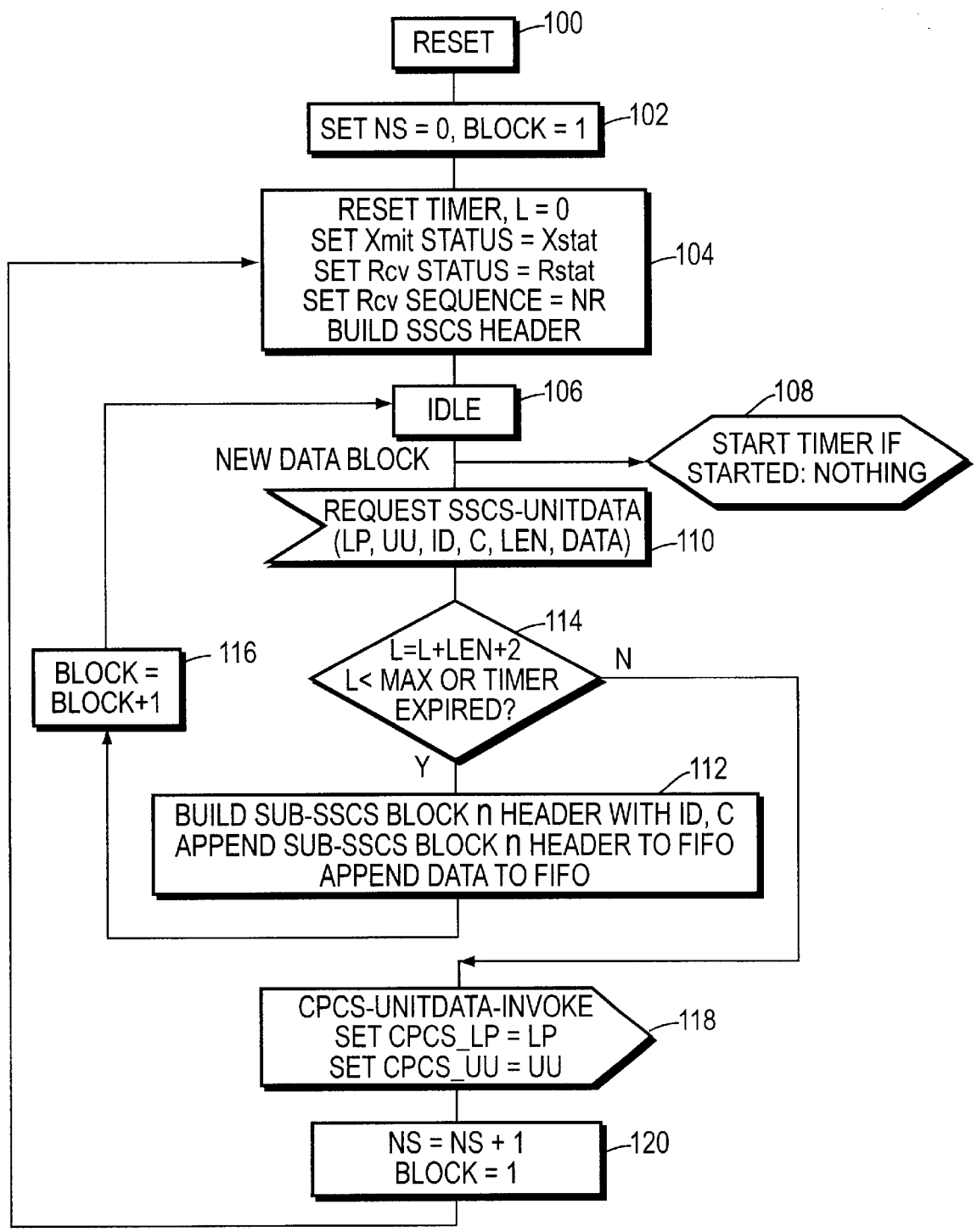
FIG. 9 is a flow-chart of the steps followed by the method of the invention when asynchronous data is to be transported over the ATM network.

FIG. 9 represents the flowchart of the steps followed by the method of the invention under the control of processing unit 40 when asynchronous data from one or several asynchronous terminals are received at endpoint 36 or 38 (see FIG. 1) and is to be transmitted over the ATM network. More precisely, the flowchart describes the task performed by the SSCS sending layer which is located between the user interface task and the CPCS task, the interface process with the user interface task being made with a Request SSCS-UNITDATA Command and the interface process with the CPCS task being made with a CPCS-UNITDATA-invoke command.

The process starts in step 100 with the reset state that may be activated through an upper layer procedure. Then, on step 102, initializations are performed by resetting the Sending sequence number NS and setting the Block number to its first value ONE. Further initializations are performed on step 104 by resetting a task timer used to avoid prolonged storage of data if no control information is received. The other SSCS header information is also initialized to values corresponding to the process performed on step 138 in FIG. 10. At this step where nothing is received, NR value will be set to value FF (H), Xstat value to start and Rstat value to start. Then the process goes to step 106 which is defined as IDLE state.

At this step, when a new data block is received by the interface task, a timer 108 is started (if not yet started). This may be done through interrupt or polling. On this routine the Request SSCS-UNITDATA is performed on step 110. This function will get all the necessary information from the interface task to process the data such as LP (Loss Priority), UU (User to User information), ID (port identification), C (Control) which indicates if associated data is pure data from the interface or a control message from the interface task, LEN (length) which indicates the length of the frame and DATA located in buffers 48. Note that the information may be only a pointer to this data.

The process then goes to step 112 where the Sub_SSCS block header is built and put into memory 50 followed by the corresponding data, unless the variable L, which is incremented by LEN+2 (the two bytes of the block header), has reached a maximum MAX or the SSCS timer has expired (step 114).

If neither of these two conditions exit, the block number is incremented, step 116, before the process goes back to step 106.

If either or both of these conditions exist, the process goes to step 118 where the CPCS task is called through the CPCS-UNITDATA-invoke command and the parameters LP and UU are forwarded from the SSCS layer to the CPCS layer. At last, the process initializes the next sequence number NS and resets the block number to 1 (step 120) which then loops back to step 104.

Figure 10:
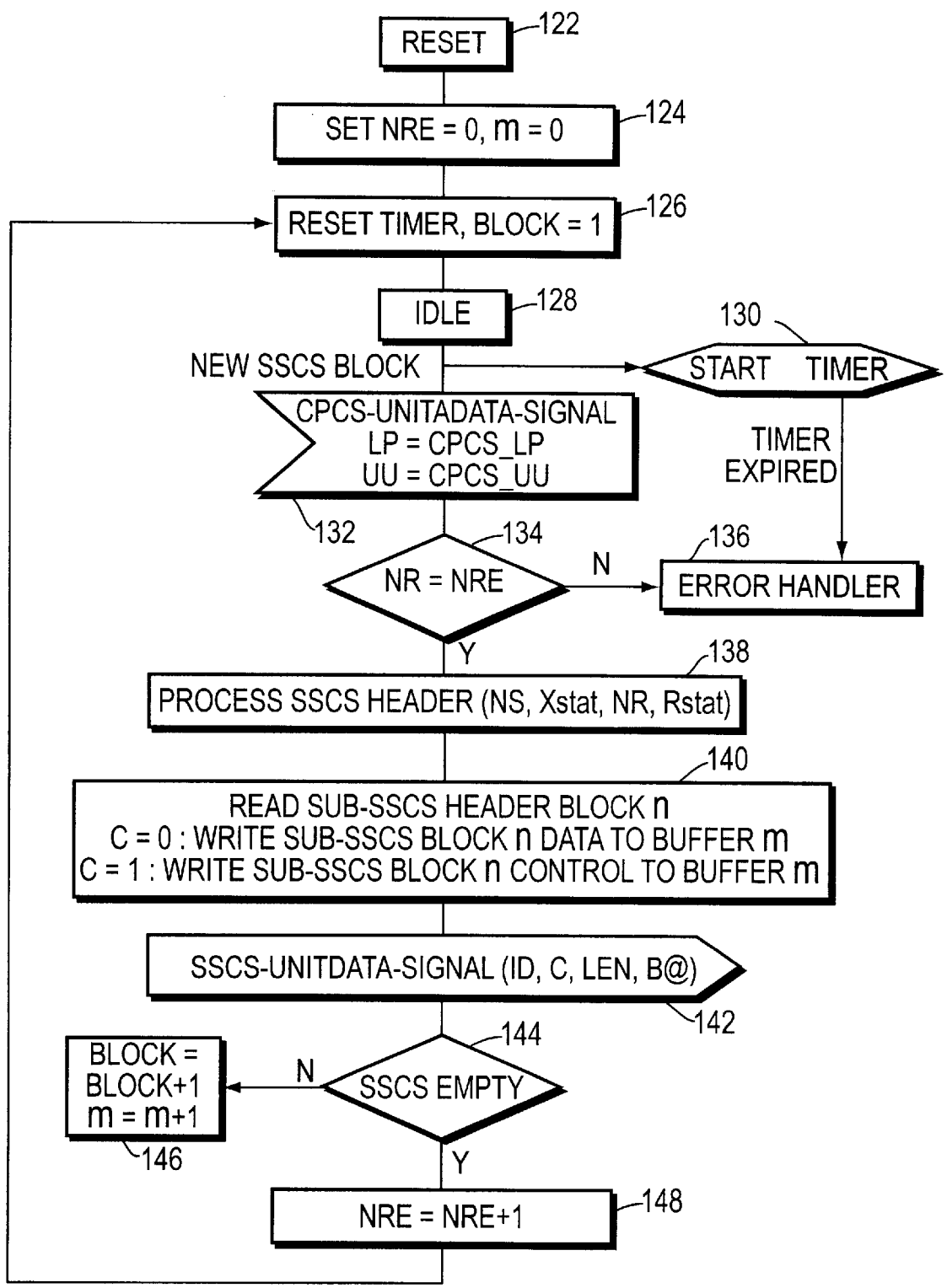
FIG. 10 is a flow-chart of the steps followed by the method of the invention when data received from the ATM network is to be transmitted as asynchronous characters.

FIG. 10 represents the flowchart of the steps performed by the method of the invention under the control of processing unit 40 when asynchronous data received from the ATM network at the endpoint must be processed before being transmitted to one or several asynchronous terminals. More precisely, this flowchart describes the task performed by the SSCP receiving layer which is located between the CPCS task and the user interface task, the interface process with the user interface task being made through a SSCS-UNITDATA-signal command and the interface process with the CPCS task being made through a CPCS-UNITDATA-signal command.

The process starts in step 122 with the reset state that may be activated through an upper layer procedure. Then, in step 124 initializations are performed by resetting the Expected Receiving sequence Number NRE and setting the Buffer number to its first value Zero. Further initializations are performed in step 126 by resetting a task timer used to avoid prolonged storage of data if no control information is received. The block number is set or reset to 1. Then, the process goes to step 128 which is defined as IDLE state.

At this step, when a new data block is received by the CPCS task, an operation timer 130 is started (if not yet started). This may be done through interrupt or polling. Timer 130 is used to set a maximum time for processing of the new data block. If the maximum time is exceeded, either because the block is too long or because other processing difficulties have been encountered, the timer expires and an error handler routine 136 is invoked. In a step 132, initiated in parallel with the start of the operation timer, the CPCS-UNITDATA-signal command is received containing all the SSCS-PDU plus LP and UU information fields.

The process then goes to step 134, where the comparison between the Receive sequence number NR and the expected sequence number NRE is performed. If they are different, the error handler routine 136 is called.

Assuming no errors are detected, the process continues in step 138 by processing all the header fields such as NS, NR, Xstat, Rstat, taking into account the possible error detected by the error handler (136). This information is reused by the corresponding SSCS sending process in step 104 in FIG. 9 to build the answer frame, joined to transmitted data.

The process, in step 140, then gets each data block and puts it in a defined buffer, with a bit being set to indicates if this buffer contains data or control.

This block with all its characteristics is sent to the upper layer thru the SSCS-UNITDATA-Signal Command in step 142.

If the SSCS is not empty in test 144, the buffer number and the Block number are incremented in step 146, and the next block is processed in step 140. If the SSCS is empty, the process is initialized by incrementing the next expected Receive sequence Number NRE on step 148 and the process is looped back to step 126 to perform additional initializations and then waits for another frame in idle step 128.

While there has been described what is considered to be a preferred embodiment of the invention, variations in and modifications to that preferred embodiment may occur to those skilled in the art. Therefore, it is intended that the appended claims shall be construed to include the preferred embodiment and all variations and modifications that fall within the true spirit and scope of the invention.

What is claimed is:

1. For use in a communication system including an intermediate network through which data is transmitted in fixed length cells and a set of one or more sources of asynchronous data traffic, a method of processing asynchronous characters provided by said sources to provide data in a form suitable for transport through the intermediate network, said method comprising the steps of:

a) removing any Start, Stop and parity bits from each asynchronous character received from any of the sources in said set to produce a character data unit;

b) assembling a data block comprising one or more character data units resulting from processing asynchronous characters received in sequence from the same source in said set;

c) adding at least one source-identifying ID byte to each assembled data block to create a data unit;

d) concatenating a plurality of data units to build a data unit frame; and e) encapsulating said data unit frame within a fixed length cell structure suitable for transport through the intermediate network.

2. For use in a communication system including an intermediate network through which data are transmitted in fixed length cells and a set of one or more sources of asynchronous data traffic, a method of processing asynchronous characters provided by said sources to provide data in a form suitable for transport through the intermediate network, said method comprising the steps of:

a) removing any Start, Stop and parity bits from each asynchronous character received from any of the sources in said set to produce a character data unit;

b) assembling a data block comprising one or more character data units resulting from processing asynchronous characters received in sequence from the same source in said set;

c) adding at least one source-identifying ID byte to each assembled data block to create a data unit, said step of adding comprising setting at least one bit in the ID byte to a value indicating whether the block contains data or control informations, and setting one or more additional bits in the ID byte to a value identifying the source;

d) concatenating a plurality of data units to build a data unit frame; and e) encapsulating said data unit frame within a fixed length cell structure suitable for transport through the intermediate network.

3. A method as set forth in claim 2 wherein the block is a control block that contains one or more bytes identifying either an ASYNC mode or a COMPRESSION mode, said bytes being intended for use at a destination in establishing a compatible destination interface.

4. A method as set forth in either of claims 2 or 3 wherein the header further includes a byte indicating the number of character data units contained in said block.

5. A method as set forth in claim 4 wherein the intermediate network is an Asynchronous Transfer Mode (ATM) network and wherein the data unit frame resulting from the step of concatenating a plurality of data units is a Service Specific Convergence Sublayer (SSCS) payload normally used for providing additional functions in an ATM Adaption layer (AAL) at an access point to the ATM network.

6. A method as set forth in claim 5 including the further step of adding a header to the SSCS payload, said header including fields defining sending and receiving sequence numbers, payload status and reception status.

7. A method as set forth in claim 6 including the further step of adding at least one byte to header identifying the number of data units contained in the SSCS payload.

8. A method as set forth in 1 wherein the step of concatenating data units to create a data unit frame is terminated when the frame length reaches a predetermined size or a predetermined period of time has elapsed, whichever is first to occur.

9. For use in a communication system including a set of one or more sources of asynchronous characters, each character conforming to a known format which may include a Start bit, a Stop bit and a parity bit, and an intermediate network through which data is transmitted in fixed length cells, said cells including a data unit frame constructed by processing of asynchronous characters received from said sources, a method of processing fixed length cells received at a destination system to retrieve asynchronous characters originally provided by said sources, said method comprising the steps of:

a) extracting a data unit frame from a received fixed-length cell;

b) disassembling said data unit frame to obtain one or more data units, each data unit comprising a data block and an ID byte;

c) using the ID byte to identify a destination system to which asynchronous characters derived from the associated data block are to be sent;

d) disassembling the associated data block to generate a character data unit for each asynchronous character to be sent; and e) adding any required Start, Stop or parity bits to each character date unit to restore the data to the original known asynchronous character format.

10. For use in a communication system including an intermediate network through which data is transmitted in fixed length cells and a set of one or more sources of asynchronous data traffic, an apparatus for processing asynchronous characters provided by said sources to provide data in a form suitable for transport through the intermediate network, said apparatus comprising:

a) means for removing any Start, Stop and parity bits from each asynchronous characters received from any of the sources in said set to produce a character data unit;

b) logic for assembling a data block comprising one or more character data unit resulting from processing asynchronous characters received in sequence from the same source in said set;

c) means for adding at least one source-identifying ID byte to each assembled data block to create a data unit;

d) logic for concatenating a plurality of data units to build a data unit frame; and e) means for encapsulating said data unit frame within a fixed length cell structure suitable for transport through the intermediate network.

11. For use in a communication system including a set of one or more sources of asynchronous characters, each character conforming to a known format which may include a Start bit, a Stop bit and a parity bit, and an intermediate network through which data is transmitted in fixed length cells, said cells including a data unit frame constructed by processing of asynchronous characters received from said sources, an apparatus for processing fixed length cells received at a destination system to recover asynchronous characters originally provided by said sources, said apparatus comprising:

a) means for extracting a data unit frame from a received fixed-length cell;

b) means for disassembling said data unit frame to obtain one or more data units, each data unit comprising a data block and an ID byte;

c) means for identifying a destination system using the ID byte;

d) means for disassembling the associated data block to generate a character data unit for each asynchronous character to be sent; and e) adding any required Start, Stop or parity bits to each character data unit to restore the data to the original known asynchronous character format.

* * * * *